3,632,628
SULFONAMIDOALKYL AMINO ACIDS
John T. Suh, Mequon, Wis., assignor to Colgate-Palmolive Company, New York, N.Y.
No Drawing. Filed Apr. 15, 1968, Ser. No. 721,195
Int. Cl. C07c 143/74
U.S. Cl. 260—470    7 Claims

ABSTRACT OF THE DISCLOSURE

The compounds are sulfonamidoalkyl amino acids useful as chelating agents and as pharmaceutical agents for the treatment of chronic hypotension. Compounds disclosed include p-methanesulfonamidophenylalanine and m-methanesulfonamidophenylalanine.

SUMMARY OF THE INVENTION

The present invention relates to novel aminoacids of the formula

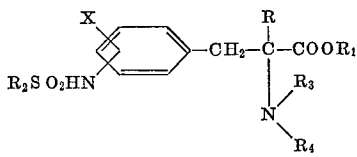

in which X is hydrogen, a halogen such as bromo or chloro, or trifluoromethyl, R is hydrogen, a lower alkyl of 1 to 4 carbon atoms such as methyl, ethyl, isopropyl or butyl, phenyl, a cycloalkyl of 3 to 7 carbon atoms such as cyclohexyl or cyclopentyl, a cycloalkyl-lower alkyl in which the cycloalkyl contains 3 to 7 carbon atoms such as cyclohexyl methyl or cyclopentyl ethyl and phenyl-lower alkyl of 7 to 13 carbon atoms such as benzyl, phenethyl or phenylisopropyl, $R_1$ is hydrogen or a lower alkyl of 1 to 4 carbon atoms, $R_2$ is a lower alkyl and $R_3$ and $R_4$ are selected from hydrogen, lower alkyl of 1 to 4 carbon atoms, a cycloalkyl of 3 to 7 carbon atoms such as cyclohexyl or cyclopentyl; a cycloalkyl-lower alkyl in which the cycloalkyl contains 3 to 7 carbon atoms such as cyclohexyl methyl or cyclopentyl ethyl and phenyl-lower alkyl of 7 to 13 carbon atoms such as benzyl, phenethyl or phenylisopropyl.

DETAILED DESCRIPTION

The compounds of the present invention are preferably prepared by reacting a compound of the formula

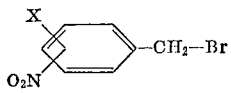

with diethylformamidomalonate in the presence of sodium ethoxide to form the corresponding ethyl α-carbethoxy-α-formamido-β-(nitrophenyl)propionate which is treated with hydrogen in the presence of a 10% palladium on carbon catalyst to form the corresponding aminophenyl derivative. The aminophenyl derivative is then treated with a lower alkyl sulfonyl chloride such as methanesulfonyl chloride in toluene under reflux conditions to form the ethyl α-carbethoxy-α-formamido-β-(lower alkylsulfonamidiophenyl)-propionate which is treated with con-centrated hydrochloric acid under reflux conditions to form the desired amino acid.

The process may be illustrated as follows:

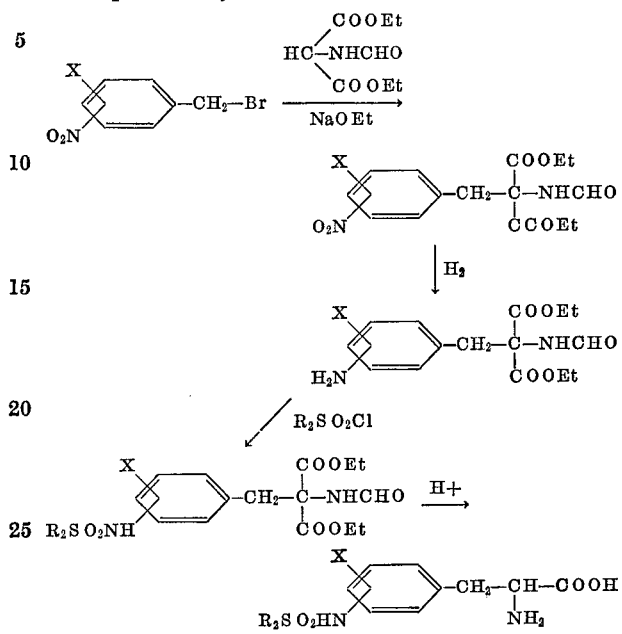

wherein X and $R_2$ are as previously defined and do not interfere with or partake in the reaction.

Representative of the compounds that can be prepared by the above process are the following:

Ethyl α-carbethoxy-α-formamido-β-(p-nitrophenyl) propionate,
Ethyl α-carbethoxy-α-formamido-β-(m-nitrophenyl) propionate,
Ethyl α-carbethoxy-α-formamido-β-(o-nitrophenyl) propionate,
Ethyl α-carbethoxy-α-formamido-β-(p-aminophenyl) propionate,
Ethyl α-carbethoxy-α-formamdio-β-(m-aminophenyl) propionate,
Ethyl α-carbethoxy-α-formamido-β-(o-aminophenyl) propionate,
Ethyl α-carbethoxy-α-formamido-β-(p-methanesulfonamidophenyl)propionate,
Ethyl α-carbethoxy-α-formamido-β-(m-methanesulfonamidophenyl)propionate,
Ethyl α-carbethoxy-α-formamido-β-(o-methanesulfonamidophenyl)propionate,
p-Methanesulfonamidophenylalanine,
o-Methanesulfonamidophenylalanine, and
m-Methanesulfonamidophenylalanine.

The compounds in which the methane sulfonamido group is in the ortho position may be prepared by reacting ethyl α - carbethoxy - α-formamido-β-(o-nitrophenyl)propionate in ethyl acetate with hydrogen in the persence of a 10% palladium on carbon catalyst to form 3-carbethoxy-3-formamido-3,4-dihydrocarbostyril, which, upon treatment with concentrated hydrochloric acid under reflux, forms 3-amino-3,4-dihydrocarbostyril hydrochloride. The latter compound upon treatment with methanesulfonyl chloride followed by treatment with acid and heat forms o-methanesulfonamidophenylalanine.

The described process may be illustrated as follows:

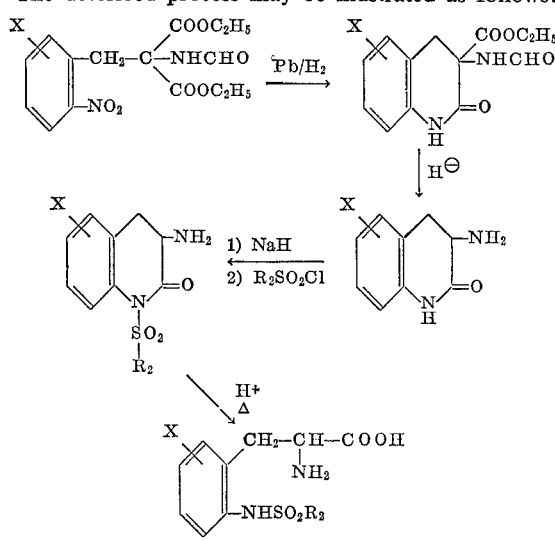

wherein X and R₁ are as previously defined and do not interfere with or partake in the reaction.

The compounds in which R is other than hydrogen, for example, methyl, may be prepared by reacting nitrophenylacetyl chloride under reflux conditions with a mixture of the magnesium-ethoxy derivative of diethyl malonate in an organic solvent.

The nitrophenylacetone thus formed is then reacted with ammonium carbonate and potassium cyanide in equal amounts of ethanol and water at 40–45° for about 10 hours. The 4-methyl-4-(nitrobenzyl)hydantoin which forms is then reacted with hydrogen, under pressure, in the presence of a 10% palladium on carbon catalyst to form the 4-methyl-4-(aminobenzyl)hydantoin. The latter compound is then reacted with methanesulfonyl chloride in the presence of triethylamine in tetrachloroethane at 110° C. to form the 4-(methanesulfonamidobenzyl)-4-methylhydantoin, which, upon treatment with barium hydroxide in water at reflux for about 50 hours, yields the α-methyl-methanesulfonamidophenylalanine.

The described process may be illustrated as follows:

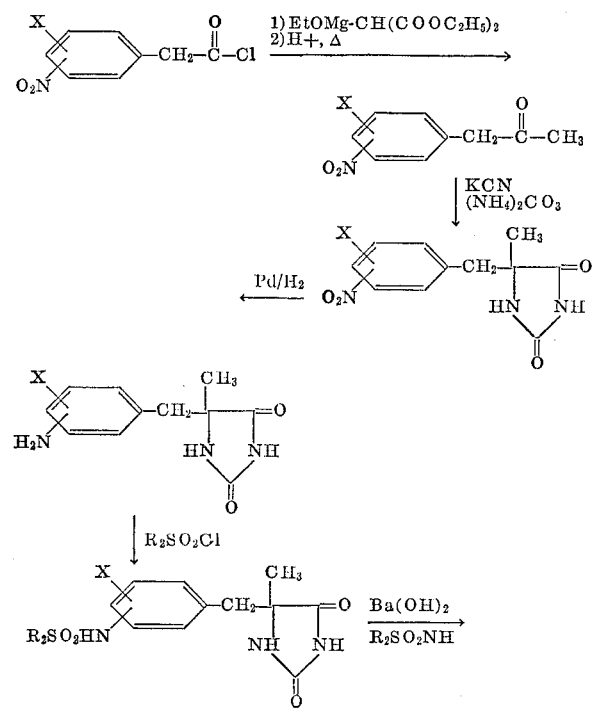

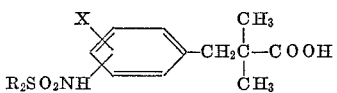

wherein X and R₁ are as previously defined and do not interfere with or partake in the reactions.

Representative of the compounds which may be prepared by the described process are 4-methyl-4-(p-nitrobenzyl)hydantoin,
4-methyl-4-(o-nitrobenzyl)hydantoin,
4-methyl-4-(m-nitrobenzyl)hydantoin,
4-ethyl-4-(p-nitrobenzyl)hydantoin,
4-butyl-4-(m-nitrobenzyl)hydantoin,
4-methyl-4-(p-aminobenzyl)hydantoin,
4-methyl-4-(o-aminobenzyl)hydantoin,
4-methyl-4-(p-methanesulfonamidobenzyl)hydantoin,
4-methyl-4-(m-methanesulfonamidobenzyl)hydantoin,
α-methyl-p-methanesulfonamidophenylalanine,
α-methyl-m-methanesulfonamidophenylalanine, and
α-methyl-o-methanesulfonamidophenylalanine.

The compounds in which R₃ and R₄ are other than hydrogen may be prepared by conventional means. For example, the compounds in which R₃ and R₄ are both methyl may be prepared by treating a suitable primary amine with formic acid and formaldehyde. Amines in which R₃ is benzyl may be prepared by treating the primary amine with benzaldehyde and then treating the resulting product with sodium borohydride or hydrogen in the presence of a suitable catalyst such as Raney nickel to form the corresponding benzylamino derivative. The monomethyl amino compound may be prepared by treating the benzylamino derivative with formic acid and formaldehyde to form the methyl benzylamino derivative which can be catalytically cleaved to form the monomethyl derivative.

The compounds in which R₃ is cycloalkyl may be prepared by treating a corresponding primary amine with a suitable ketone such as cyclohexanone in the presence of hydrogen in ethanol to form the corresponding amine.

The novel amino acids of the present invention can be employed as chelating agents for heavy metal ions, particularly iron ions, in chemical processes in which it is desired to inactivate the heavy metal ions to prevent them from interfering with the desired reactions. The compounds are readily soluble in warm water and can simply be added to the solution containing the undesired ions.

Acid addition salts of the amino acids of the present invention may be conveniently produced by contacting the compounds in a suitable mutual solvent with an acid such as formic acid, citric acid, maleic acid, sulfuric acid, hydrochloric acid, succinic acid, tartaric acid, benzoic acid or fumaric acid.

The novel sulfonamidoalkyl amino acids of the present invention also possess pharmaceutical utility, e.g., as hypertensive agents. In the standard denervated chloralose anesthetized cat preparation, the administration of p-methanesulfonamidophenylalanine hydrochloride ethanol and m-methanesulfonamidophenylalanine hydrochloride ethanol resulted in a 10 to 15% general increase in the blood pressure of the animal at intravenou doses of 1.0, 3.0, and 10 mg./kg.

In the above test the cat is anesthetized initially with ether and then maintained on chloralose (75.0 mg./kg. intravenous). The denervation consists of an acute section of the right cervical sympathetic nerve caudal to the superior cervical ganglion and section of the left vagus. The blood pressure of the animal is measured at the left carotid artery. The compounds to be tested are prepared as 1% aqueous solutions and administered through an indwelling catheter in the right femoral vein.

The toxicity and general behavioral effects of the compounds were evaluated essentially in accordance with the procedure outlined by Irwin in "Animal and Clinical Pharmacological Techniques in Drug Evaluation," J. H. Nodine and P. E. Siegler, Ed., Year Book Medical Publishers, Inc., Chicago, Ill. (1964), pp. 36–54. The two compounds described in the previous paragraph were both found to have a $LD_{50}$ greater than 700 mg./kg.

When intended for pharmaceutical use, the compounds or their pharmaceutically acceptable salts are preferably combined with pharmaceutical excipients and formed into unit dosage forms suitable for oral or parenteral administration such as tablets, capsules, sterile solutions, or the like. Among the excipients which may be employed are diluents such as sugar, starch, and talc, lubricants such as magnesium stearate, binders such as gelatin, flavoring agents and disintegrating agents.

The unit dosage forms will usually contain 150 to 500 mg. of the active ingredient. The number of unit dosage forms a patient will receive per day will depend upon the activity of the active compound and the severity of the patient's condition.

Generally, the daily dose to control chronic hypotension in an average weight adult will range from 200 mg. per day to as much as 2 to 3 grams.

The following examples illustrate the practice of the invention:

Example 1.—Ethyl-α-carbethoxy-α-formamido-β-(p-nitrophenyl)propionate

To a solution of 3.4 g. of sodium (0.148 mole) in 350 ml. of ethanol is added 29.5 g. (0.145 mole) of diethyl formamidomalonate and the mixture is stirred for 0.5 hours. α-Bromo-p-nitrotoluene (31.4 g., 0.145 mole) is added in 5 minutes and the mixture refluxed for 3.5 hours. The reaction mixture is cooled and diluted to 1.7 liters with water. The solids are collected, washed with water and recrystallized from 450 ml. of acetonitrile to yield ethyl α-carbethoxy - α - formamido - β - (p-nitrophenyl) propionate in the form of a yellow white crystalline solid, M.P. 188–189°.

Analysis.—Calcd. for $C_{15}H_{18}N_2O_7$ (percent): C, 53.25; H, 5.36; N, 8.26. Found (percent): C, 53.02; H, 5.46; N, 8.08.

Example 2.—Ethyl α-carbethoxy-a-formamido-β-(p-aminophenyl)propionate

To a dispersion of 5.0 g. (0.0155 mole) of ethyl α-carbethoxy-α-formamido - β - (p - nitrophenyl)propionate in 150 ml. of ethyl acetate is added 1.0 g. of 10% palladium on carbon. The mixture is shaken with hydrogen (36.3 p.s.i.) until the theoretical amount (3.8 p.s.i.) has been taken up in 20 minutes. The catalyst is removed by filtration and the filtrate concentrated to yield a solid which is recrystallized from isopropanol to yield ethyl α-carbethoxy-α-formamido - β - (p - aminophenyl)propionate in the form of a pink crystalline solid, M.P. 130–132°.

Analysis.—Calcd. for $C_{15}H_{20}N_2O_5$ (percent): C, 58.43; H, 6.54; N, 9.09. Found (percent): C, 58.50; H, 6.35; N, 9.08.

Example 3.—Ethyl α-carbethoxy-α-formamido-β-(m-nitrophenyl)propionate

To a solution of 3.1 g. (0.135 mole) of sodium in 350 ml. of ethanol is added 25.0 g. (0.123 mole) of diethyl formamidomalonate and the mixture is stirred for 0.5 hour. α-Bromo-m-nitrotoluene (26.7 g., 0.123 mole) is added in 5 minutes, refluxed for 3.5 hours, and stirred at room temperature for 13 hours. The reaction mixture is diluted to 2 liters with water and cooled. The solids are collected, washed with water and recrystallized twice from isopropanol to yield ethyl α-carbethoxy-α-formamido-β-(m-nitrophenyl)propionate in the form of pale yellow crystals, M.P. 144–147°.

Analysis.—Calcd. for $C_{15}H_{18}N_2O_7$ (precent): C, 53.25; H, 5.26; N, 8.26. Found (percent): C, 53.80; H, 5.63; N, 8.17.

Example 4.—Ethyl α-carbethoxy-α-formamido-β-(p-methanesulfonamidophenyl)propionate To a dispersion of 2.5 g. (0.00813 mole) of ethyl α-carbethoxy-α-formamido-β-(p - aminophenyl)propionate and 0.97 g. (0.64 ml., 0.0085 mole) of methanesulfonyl chloride in 100 ml. of toluene is added 0.65 g. (0.66 ml., 0.0082 mole) of pyridine and the mixture is refluxed gently for 8.5 hours. The mixture is cooled, diluted with 200 ml. of chloroform, washed with 50 ml. of brine, dried and concentrated to yield a solid which is recrystallized from 80 ml. of isopropanol to yield ethyl α-carbethoxy-α-formamido-β-(p - methanesulfonamidophenyl)-propionate in the form of a light grey powder, M.P. 183–185°.

Analysis. — Calcd. for $C_{16}H_{22}N_2O_7S$ (percent): C, 49.74; H, 5.74; N, 7.26. Found (percent): C, 49.88; H, 5.46; N, 7.30.

Example 5.—Ethyl α-carbethoxy-α-formamido-β-(m-aminophenyl)propionate

To a dispersion of 10.0 g. (0.031 mole) of ethyl α-carbethoxy - α - formamido - β - (m - nitrophenyl)propionate in 150 ml. of ethyl acetate is added 1.0 g. of 10% palladium on carbon. The mixture is shaken with hydrogen (31.3 p.s.i.) until the theoretical amount (7.6 p.s.i.) has been taken up in 20 minutes. The catalyst is removed by filtration and the filtrate concentrated to yield a solid which is recrystallized from isopropanol to yield ethyl α-carbetoxy-α-formamido-β-(m-aminophenyl)propionate in the form of white platelets, M.P. 93–95°.

Analysis.—Calcd. for $C_{15}H_{20}N_2O_5$ (percent): N, 9.09 Found (percent): N, 8.91.

Example 6.—Ethyl α-carbethoxy-α-formamido-β-(o-nitrophenyl)propionate

To a solution of 3.45 g. (0.15 mole) of sodium in 250 ml. of ethanol is added 25 g. (0.123 mole) of diethyl formamido-malonate. The mixture is stirred at room temperature for 1.5 hours after which 21.1 g. (0.123 mole) of α-chloro-o-nitrotoluene is added in 5 minutes. The reaction mixture is refluxed for 45 minutes, concentrated to 75 ml., diluted to 2 liters with water and cooled. The solids are collected, washed and dissolved in a solution of 450 ml. of ethanol and 50 ml. of acetonitrile which is treated with activated charcoal and concentrated to 350 ml. and cooled. The resulting solids are recrystallized twice from alcohol to yield the product in the form of a white crystalline solid, M.P. 129–130.5°.

Analysis.—Calcd. for $C_{15}H_{18}N_2O_7$ (percent): C, 53.25; H, 5.36; N, 8.26. Found (percent): C, 53.29; H, 5.22; N, 8.05.

Example 7.—Ethyl α-carbethoxy-α-formamido-β-(m-methanesulfonamidophenyl)propionate To a dispersion of 3.16 g. (0.0103 mole) of ethyl α-carbethoxy - α - formamido - β - (m - aminophenyl)propionate and 0.98 g. (0.0123 mole, 1 ml.) of pyridine in 100 ml. of toluene is added 1.64 g. (0.0144 mole, 1.1 ml.) of methanesulfonyl chloride. The mixture is heated to 50° in 0.5 hour and maintained there for 5 hours. It is concentrated and the residue dissolved in 100 ml. of chloroform which is washed with 50 ml. of water, dried and concentrated to yield a viscous oil which is crystallized from 50 ml. of benzene to yield ethyl α-carbethoxy-α-formamido - β - (m-methanesulfonamidophenyl)-propionate in the form of a light pink powder, M.P. 103.5–105.5°.

Analysis.—Calcd. for $C_{16}H_{22}N_2O_7S$ (percent): S, 8.30. Found (percent): S, 8.18.

Example 8.—m-Methanesulfonamidophenylalanine hydrochloride ethanolate

A dispersion of 11.0 g. (0.0284 mole) of ethyl α-carbethoxy - α - formamido - β - (m - methylsulfonamidophenyl)propionate in 100 ml. of concentrated hydrochloric acid is refluxed for 1 hour. The acid is removed by distillation in vacuo and the residue dissolved in 25 ml. of water and concentrated to yield a glass which is dissolved in a solution of 150 ml. of ethanol and 100 ml. of benzene and again concentrated to dryness. The residue is heated in vacuo at 90° for 1 hour, cooled and triturated under ether. It is collected and dried at 60° for 16 hours to yield m-methanesulfonamidophenylalanine hydrochloride ethanolate in the form of a brown light textured solid, M.P. (reduce) 120° (melt) 122°.

Analysis.—Calcd. for $C_{32}H_{51}Cl_3N_6O_{13}S_3$ (percent): C, 41.31; H, 5.53; N, 9.04; S, 10.34; $C_2H_5OH$, 4.9. Found (percent): C, 41.43; H, 5.49; N, 8.84; S, 9.81; $C_2H_5OH$, 4.5.

Example 9.—p-Methanesulfonamidophenylalanine hydrochloride ethanolate

A dispersion of 5.0 g. (0.013 mole) of ethyl α-carbethoxy - α - formamido - β - (p-methylsulfonamidophenyl)propionate in 50 ml. of concentrated hydrochloric acid is heated to reflux in 0.5 hour and maintained there for 2 hours. The acid is removed by distillation in vacuo and the residue dissolved in 25 ml. of water and concentrated to yield a solid which is dissolved in 100 ml. of ethanol and again concentrated to dryness. The resulting glass is triturated under ether, collected and dried (at 60° for 16 hours) to yield p-methanesulfonamidophenylalanine hydrochloride ethanolate in the form of a brown light textured solid, M.P. 200°.

Analysis.—Calcd. for $C_{32}H_{51}Cl_3N_6O_{13}S_3$ (percent): C, 41.31; H, 5.53; N, 9.04; Cl⁻, 11.43; $C_2H_5OH$, 4.9. Found (percent): C, 41.47; H, 5.54; N, 8.75; Cl⁻, 11.69; $C_2H_5OH$, 5.0.

Example 10.—3-carbethoxy-3-formamido-3,4-dihydrocarbostyril

To a dispersion of 14.3 g. (0.0423 mole) of ethyl α-carbethoxy - α - formimido - β - (o - nitrophenyl)propionate in 150 ml. of ethyl acetate is added 0.1 g. of 10% palladium on carbon. The mixture is shaken with hydrogen (26.2 p.s.i.) until the theoretical amount (10.4 p.s.i.) has been taken up in 1.5 hours. The catalyst is removed by filtration and the filtrate concentrated to yield a solid which is refluxed in a solution of 30 ml. of ethanol and 100 ml. of benzene for 16 hours. The solution is concentrated and the residue recrystallized from isopropanol to yield 3-carbethoxy-3-formamido-3,4-dihydrocarbostyril in the form of a white solid, M.P. 187–188.5°.

Analysis.—Calcd. for $C_{13}H_{14}N_2O_4$ (percent): C, 59.56; H, 5.38; N, 10.68. Found (percent): C, 59.77; H, 5.46; N, 10.68.

Example 11.—p-Nitrophenylacetone

A solution of 1.1 ml. of chloroform and 11 ml. of ethanol is added to 11.7 g. (0.48 mole) of magnesium and stirred for 3 minutes. Ether (165 ml.) is added cautiously, heated to reflux on a steam bath and a solution of 76.7 g. (0.48 mole) of diethyl malonate in 44 ml. of ethanol and 55 ml. of ether is added in 0.5 hours at a rate to maintain a vigorous reflux. The mixture is then stirred at room temperature for 2 hours. External heat is then applied to continue refluxing for an additional 1 hour. The clear solution is cooled to room temperature and a solution of 87.8 g. (0.44 mole) of p-nitrophenylacetyl chloride in 600 ml. of ether added in 1 hour and refluxed for 2 hours. It is cooled slightly and 200 ml. of 25% sulfuric acid solution added in 10 minutes and stirred for 0.5 hour. The organic layer is separated, washed successively with 200 ml. of water and 100 ml. of brine and concentrated. To the resulting yellow oil is added 180 ml. of glacial acetic acid, 16.5 ml. concentrated sulfuric acid and 87 ml. of water. The mixture is heated to reflux and the distillate removed until the B.P. of 95° has been reached, after which reflux is maintained for 3¾ hours. The solution is cooled to room temperature and poured into 1 liter of water and cooled. The precipitated solids are collected, washed twice with water, twice with saturated sodium bicarbonate solution and twice with water and dried, after which they are recrystallized from 250 ml. of ether diluted with 200 ml. of petroleum ether to yield p-nitrophenylacetone in the form of brown platelets, M.P. 61.5–63°.

Analysis.—Calcd. for $C_9H_9NO_3$ (percent): C, 60.34; H, 5.06; N, 7.82. Found (percent): C, 60.26; H, 5.14; N, 8.07.

Example 12.—3-amino-3,4-dihydrocarbostyril hydrochloride

A dispersion of 2.7 g. (0.0103 mole) of 3-carbethoxy-3-formamido-3,4-dihydrocarbostyril in 50 ml. of concentrated hydrochloric acid is refluxed for 1.5 hours. The solution is cooled slightly and concentrated in vacuo to dryness. The residue is dissolved in 25 ml. of water and concentrated; the residue is recrystallized from ether/methanol to yield in two crops 3-amino-3,4-dihydrocarbostyril hydrochloride in the form of a light textured white solid, M.P. 300°.

Analysis.—Calcd. for $C_9H_{11}ClN_2O$ (percent): C, 54.41; H, 5.58; N, 14.11. Found (percent): C, 54.50; H, 5.87; N, 14.39.

Example 13.—4-methyl-4-(p-nitrobenzyl)hydantoin

A mixture of 17.9 g. (0.1 mole) of p-nitrophenylacetone, 84 g. (0.91 mole) of ammonium carbonate and 8.4 g. (0.129 mole) of potassium cyanide in a solution of 250 ml. of water and 250 ml. of ethanol is heated at 40–45° for 10 hours and stirred at room temperature for 8 hours. Solvent (275 ml.) is removed by distillation in vacuo and the residue is cooled. The precipitated solids are collected and recrystallized from 1.1 liter of boiling water to give 4-methyl-4-(p-nitrobenzyl)hydantoin in the form of a light yellow powder in three crops, M.P. 221–224°.

Example 14.—4-methyl-4-(p-aminobenzyl)hydantoin

A mixture of 4.0 g. of 4-methyl-4-(p-nitrobenzyl)hydantoin and 200 mg. of 10% palladium on carbon in 100 ml. of ethanol is shaken with hydrogen (34.5 p.s.i.) until the theoretical amount (3.96 p.s.i.) has been taken up in 1 hour. The catalyst is removed by filtration and the filtrate concentrated to yield a glass which is crystallized from 35 ml. of water to yield 4-methyl-4-(p-aminobenzyl)hydantoin in the form of light yellow crystals, M.P. 178–180°.

Analysis.—Calcd. for $C_{11}H_{13}N_3O_2$ (percent): C, 60.26; H, 5.98; N, 19.15. Found (percent): C, 60.25; H, 6.05; N, 18.99.

Example 15.—α-Methyl-p-nitrophenylalanine

A mixture of 30.9 g. (0.124 mole) of 4-methyl-4-(p-nitrobenzyl)hydantoin and 161 g. (0.51 mole) of barium hydroxide in 800 ml. of water is refluxed for 68 hours. The mixture is cooled to 25° and the solids removed by filtration. The filtrate is adjusted to acidity with 16 ml. of concentrated sulfuric acid. Diatomaceous earth is added and the precipitated solid removed by filtration. The filtrate is adjusted to pH 7 with 6 N sodium hydroxide solution and concentrated in vacuo to 800 ml., treated with activated charcoal and concentrated to dryness. Ethanol (300 ml.) is added to the solid and refluxed ½ hour. The mixture is cooled and the solids collected and dried to yield α-methyl-p-nitrophenylalanine in the form of a yellow solid, M.P. 249°. An analytical sample is prepared by recrystallization from water to give α-methyl-p-nitrophenylalanine as a yellow powder, M.P. 257–259°.

Analysis.—Calcd. for $C_{10}H_{12}N_2O_4$ (percent): C, 53.57; H, 5.40; N, 12.49. Found (percent): C, 53.84; H, 5.69; N, 12.14.

Example 16.—N-acetyl-α-methyl-p-nitrophenylalanine

A mixture of 5.0 g. (0.0224 mole) of α-methyl-p-nitrophenylalanine and 4.0 g. (0.049 mole) of anhydrous sodium acetate in 125 ml. of acetic anhydride is refluxed for 3½ hours, cooled to 25° and poured into 200 ml. of water. The clear solution is treated with activated charcoal and concentrated to near dryness. The residue is dissolved in 60 ml. of water, cooled, seeded and periodically scratched to yield N-acetyl-α-methyl-p-nitrophenylalanine in the form of a yellow solid in two crops, M.P. 140–160°. An analytical sample is prepared by recrystallization from water to yield the desired compound as a yellow powder, M.P. 226–227°.

*Analysis.*—Calcd. for $C_{12}H_{13}N_2O_5$ (percent): C, 54.12; H, 5.30; N, 10.53. Found (percent): C, 54.26; H, 5.53; N, 10.54.

Example 17.—4 - (p-methanesulfonamidobenzyl)-4-methylhydantoin iso-propanolate

To a solution of 3.2 g. (0.015 mole) of 4-methyl-4-(p-aminobenzyl)-hydantoin and 3.0 g. (0.029 mole) of triethylamine in 150 ml. of tetrachloroethane which is heated to 110° is added to a solution of 3.34 g. (0.029 mole) of methanesulfonylchloride in 20 ml. of tetrachloroethane in 15 minutes and the mixture is heated at 110° for 10 hours. The mixture is cooled to 25°, the solids collected, washed with water and recrystallized twice from 2-propanol to yield 4-(p-methanesulfonamidobenzyl)-4-methyl hydantoin iso-propanolate in the form of a light yellow solid, M.P. 115–117°.

*Analysis.*—Calcd. for $C_{15}H_{23}N_3SO_5$ (percent): C, 50.41; H, 6.48; N, 11.76; S, 8.97. Found (percent): C, 50.54; H, 6.69; N, 11.71; S, 8.94.

Example 18.—α-Methyl-p-methanesulfonamidophenyl-alanine monohydrate

A mixture of 2.5 g. (0.008 mole) of 4-(p-methanesulfonamidobenzyl) - 4 - methylhydantoin monohydrate and 10.0 g. (0.032 mole) of $Ba(OH)_2 \cdot 8H_2O$ in 50 ml. of water is refluxed for 54 hours. While still warm, the mixture is filtered and the filtrate adjusted to acidity with concentrated $H_2SO_4$. The solid is removed by filtration and the filtrate adjusted to pH 7 with 0.1 N NaOH solution. After cooling the resulting solid is collected and dried to yield α-methyl-p-methanesulfonamidophenyl-alanine monohydrate in the form of a white light textured solid, M.P. 274°.

*Analysis.*—Calcd. for $C_{11}H_{18}N_2O_5S$ (percent): S, 11.04. Found (percent): S, 11.06.

I claim:

1. A compound selected from the group consisting of compounds and pharmaceutically acceptable salts of compounds of the formula

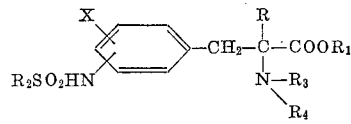

in which X is hydrogen, halo or trifluoromethyl, R is hydrogen, a lower alkyl of 1 to 4 carbon atoms, phenyl, a cycloalkyl of 3 to 7 carbon atoms, a cycloalkyl-lower alkyl in which the cycloalkyl contains 3 to 7 carbon atoms or a phenyl-lower alkyl of 7 to 13 carbon atoms, $R_1$ is hydrogen or lower alkyl, $R_2$ is lower alkyl and $R_3$ and $R_4$ are hydrogen, lower alkyl, a cycloalkyl of 3 to 7 carbon atoms, a cycloalkyl-lower alkyl in which the cycloalkyl contains 3 to 7 carbon atoms or a phenyl-lower alkyl of 7 to 13 carbon atoms.

2. A compound of claim 1 in which R is hydrogen.
3. A compound of claim 1 in which R is lower alkyl.
4. A compound of claim 1 in which R is hydrogen, $R_1$ is methyl and $R_3$ and $R_4$ are hydrogen.
5. A compound of claim 1 in which X and R are hydrogen and $R_1$, $R_3$ and $R_4$ are methyl.
6. A compound of claim 1 in which X, R, $R_3$ and $R_4$ are hydrogen and $R_1$ is methyl.
7. A compound of claim 1 in which X, R, $R_3$ and $R_4$ are hydrogen and $R_1$ is lower alkyl.

References Cited

Saari, W. S. et al.: J. Med. Chem., 10(6), 1008–14 (1967).

LORRAINE A. WEINBERGER, Primary Examiner

J. F. TERAPANE, Assistant Examiner

U.S. Cl. X.R.

260—287, 288, 309.5, 471 A, 518 R, 518 A, 544 M, 590, 646; 424—309